(No Model.) 3 Sheets—Sheet 1.

J. F. WEBSTER.
MACHINE FOR FINISHING HARVESTER FINGERS.

No. 337,802. Patented Mar. 9, 1886.

Attest:
P. Willis Baines
P. H. Clevenger

Inventor:
John F. Webster
By [signature]
Atty (No Model.) 3 Sheets—Sheet 2.
J. F. WEBSTER.
MACHINE FOR FINISHING HARVESTER FINGERS.
No. 337,802. Patented Mar. 9, 1886.
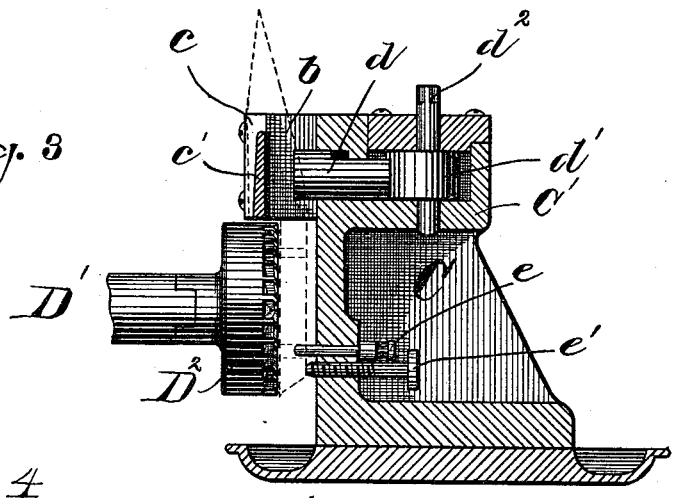
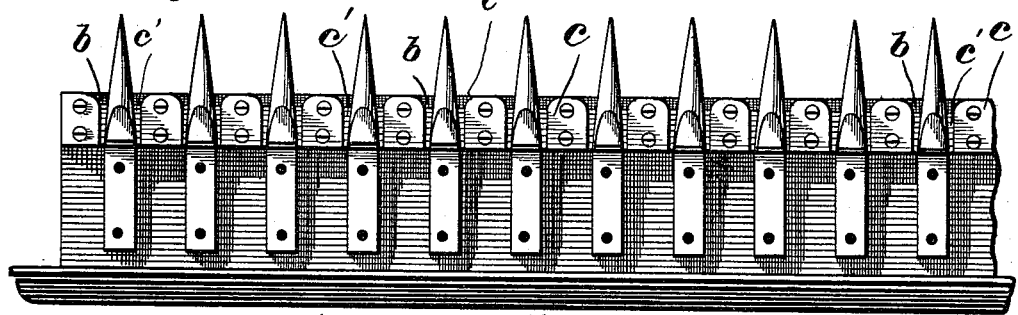
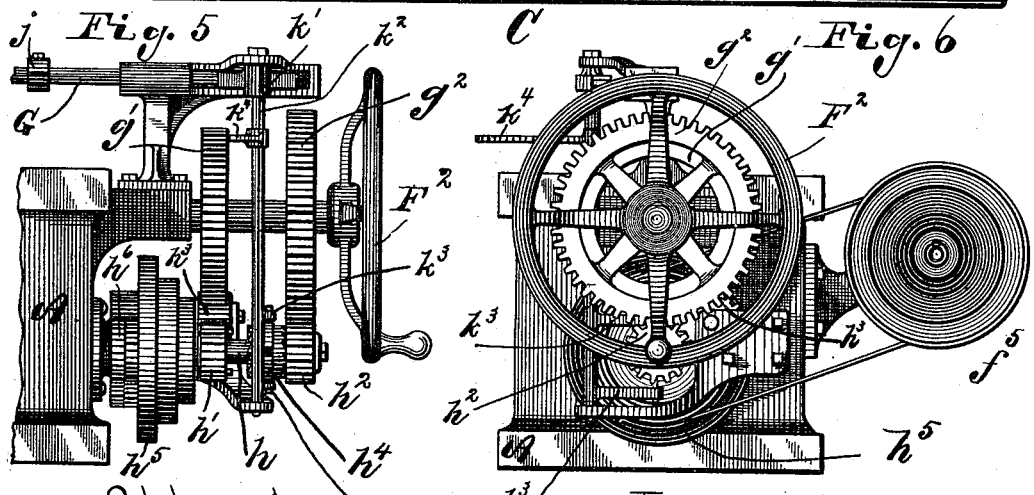
Attest:
P. Willis Baines.
P. J. Clevenger.
Inventor:
John F. Webster
By Paul A. Staley
att'y (No Model.)  3 Sheets—Sheet 3.
J. F. WEBSTER.
MACHINE FOR FINISHING HARVESTER FINGERS.
No. 337,802. Patented Mar. 9, 1886.
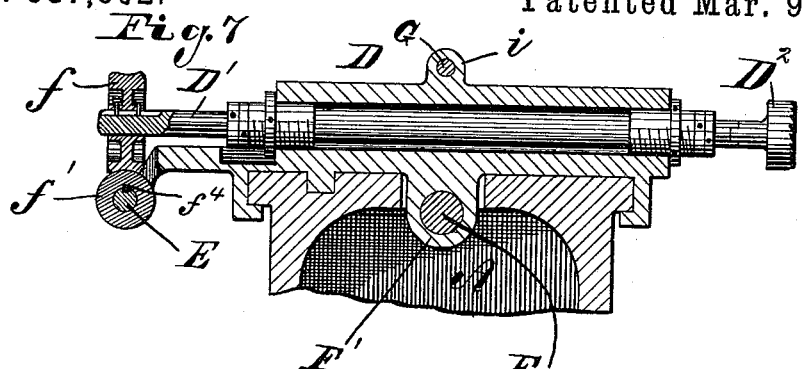
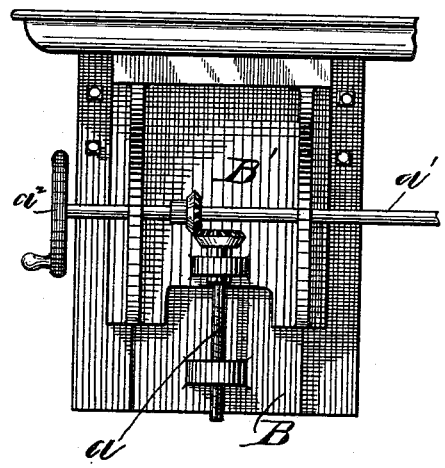
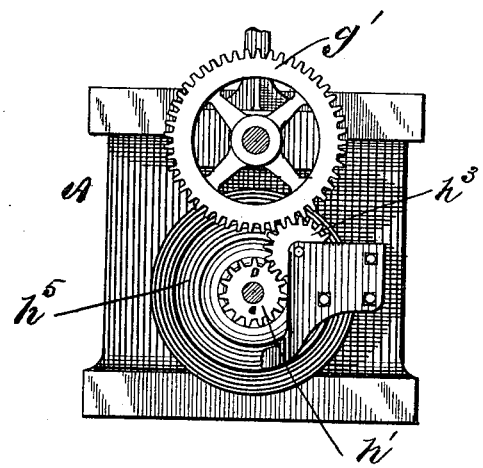
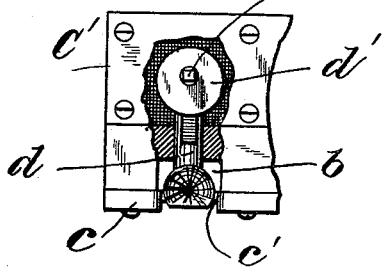
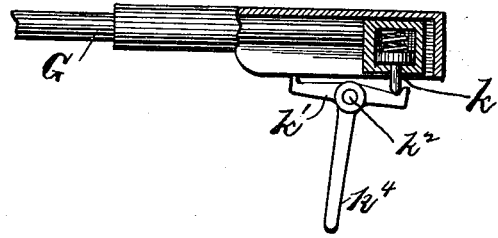
Attest:
Willis Raines
P. J. Colvenger
Inventor:
John F. Webster
By Amos H. Stites
Atty.

UNITED STATES PATENT OFFICE.

JOHN F. WEBSTER, OF SPRINGFIELD, OHIO, ASSIGNOR TO THE CHAMPION BAR AND KNIFE COMPANY, OF SAME PLACE.

MACHINE FOR FINISHING HARVESTER-FINGERS.

SPECIFICATION forming part of Letters Patent No. 337,802, dated March 9, 1886.

Application filed January 6, 1886. Serial No. 187,797. (No model.)

*To all whom it may concern:*

Be it known that I, JOHN F. WEBSTER, a citizen of the United States, residing at Springfield, in the county of Clark and State of Ohio, have invented certain new and useful Improvements in Constructing Finger-Bars for Harvesters, of which the following is a specification.

My invention relates to the construction of finger-bars for harvesting machinery.

The object of my invention is to provide means for truing-up the shanks of the guard-fingers, so that when secured to the finger-bar they will be uniform and in exact alignment for the cutting-knife.

In fitting up finger-bars it is essential that the cutting-surfaces of the fingers are all of a uniform height, and that the series of fingers maintain a perfect alignment, in order that the cutting-knife will work freely and accurately therein. This I accomplish by the mechanism shown in the accompanying drawings, in which—

Figure 1:
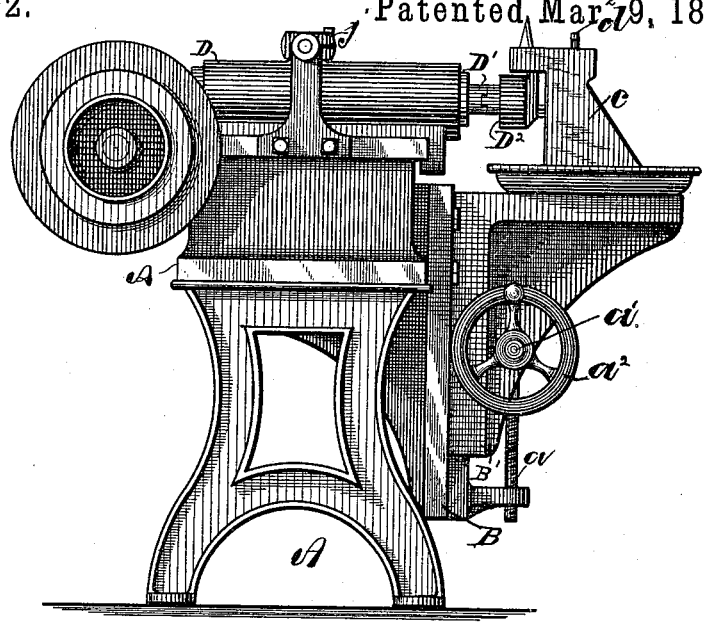
Figure 2:
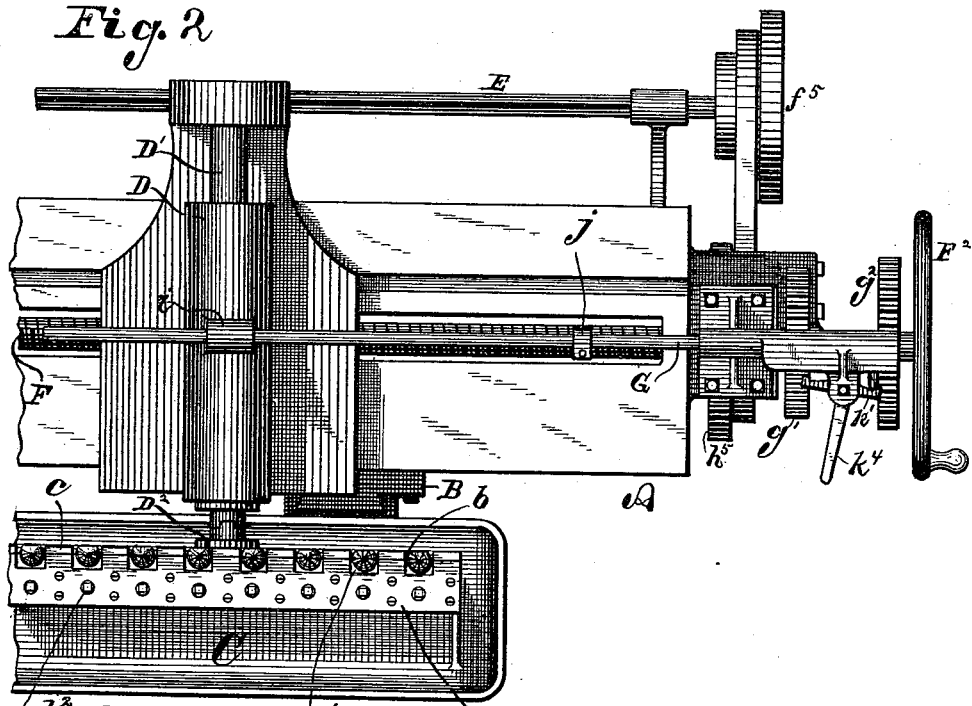

Figure 1 is an end elevation view of a machine embodying my invention. Fig. 2 is a partial plan view of the same. Fig. 3 is a sectional elevation of the chucking or holding device for holding the fingers, showing the manner of applying the same to the milling-tool. Figs. 4 to 11, inclusive, are detailed views of some of the various parts, which will be referred to hereinafter.

In the said drawings, A represents the main frame, which in general construction is similar to the frame or bed of a common lathe.

On the front side of the frame, at or near each end thereof, are secured guides or ways B, on which movable heads B' are adapted to slide. These heads are adapted to be raised or lowered vertically, preferably by vertical adjusting-screws $a$, adapted to be operated in a suitable manner from a horizontal shaft, $a'$, provided with a hand-screw, $a^2$, by means of which the respective heads may be raised or lowered simultaneously. (See Fig. 8.)

Supported on the movable heads B', and rigidly secured thereto by bolts or otherwise, is the chucking mechanism C, by which the guard-fingers are held during the operation of milling. This chucking mechanism is constructed as follows:

Extending for almost the entire length of the machine is the clamping-head C', provided at either end with suitable ribs, to secure the necessary strength, and having on the inner sides thereof a series of openings or pockets, $b$, adapted to receive the guard-fingers to be operated upon.

On the inner face of the clamping-head C' is secured a longitudinal gage-strip, $c$, which extends the entire length of the clamping-head and forms the inner or front side of the pockets $b$. This gage-strip $c$ is preferably made of steel, and secured to the clamping-head by screws, as shown in Fig. 4, or in any other suitable manner. At each pocket the said strip is reduced, as shown at $c'$, Fig. 3, in size and form to fit the slot in the guard-finger placed in the said pocket $b$. From the rear is a sliding piston, $d$, the inner end of which is preferably made to conform to the bottom of the guard-finger.

Journaled in suitable bearings at the rear of each of the pistons $d$ is a cam, $d'$, the axle or journal $d^2$ of which is extended above the top of the clamping-head C', and provided with a square head or shank adapted to be engaged by a suitable wrench or crank, by which the cam may be revolved. (See Figs. 3 and 10.)

Projecting horizontally through the clamping-head C', below each of the pockets $b$ and cams $d'$, is a sliding pin, $e$, and immediately below the sliding pin $e$ is a bearing-screw, $e'$, which also extends horizontally through the front face of the said clamping-head. These devices and their functions will be particularly referred to hereinafter.

Supported on the top of the main frame or bed A is a traveling head, D, which is provided with suitable bearings for a shaft, D', on the end of which is secured a revolving cutter or milling-tool, D².

Means are provided for continuously revolving the milling-tool D², and at the same time the traveling head D is moved longitudinally along the frame A in either direction. I preferably accomplish this by means of a worm-gear, $f$, on the end of the shaft D', adapted to engage with a worm, $f'$, on a longitudinal driving-shaft, E, which extends along the entire length of the frame A at the side thereof. (See Figs. 2 and 7.) The shaft E is provided throughout its entire length with a key way or slot, $f^3$, in which a spline or feathered key, $f^4$, in the worm $f^2$ is adapted to engage.

Extending longitudinally in the frame A, under the traveling carriage D, is a feed-screw, F, which passes through a projection, F', on the head D, the said projection F' being bored out and internally screw-threaded to fit said screw. The feed-screw F is journaled at either end in suitable bearings on the frame A, and projects through the frame at one end, and is provided with two spur-gears, $g'$ and $g^2$, and a hand-wheel, $F^2$.

Immediately below the gears $g'$ and $g^2$ is a small counter-shaft, $h$, supported in suitable bearings on the end of the frame, and provided with two spur-pinions, $h'$ $h^2$, journaled loosely thereon. (See Figs. 5, 6, and 9.) The pinion $h^2$ meshes directly with the spur-gear $g^2$ on the screw F. The pinion $h'$, however, meshes with an intermediate gear, $h^3$, which in turn engages with the spur-gear $g'$ on the said screw. Each of the pinions $h'$ $h^2$ is provided on one face with a clutch adapted to be engaged by a clutch-collar, $h^4$, which is free to move longitudinally on the shaft, but revolves positively therewith. The counter-shaft $h$ receives its motion from the longitudinal driving-shaft E by means of a belt running on suitable cone-pulleys $f^5$ and $h^5$, on the respective shafts E and $h$. The cone-pulley $h^5$ is journaled loosely on the shaft $h$, and transmits its motion to said shaft through the medium of a differential gear, $h^6$, the moving parts of which are secured to said shaft and cone, respectively. By this means a very slow motion is imparted to the shaft $h$ from a rapid movement of the driving-shaft E.

Extending longitudinally above the frame A, parallel with the screw F, is a sliding rod, G, which is supported at either end in suitable bearings, in which it is adapted to slide longitudinally. This sliding rod passes through a lug or projection, $i$, on the traveling head D, and is provided on either side of the said head with an adjustable collar, $j$, adapted to be secured tightly to said rod. When the traveling carriage has moved far enough in either direction, the projection $i$ strikes the collar $j$, and thus moves the rod longitudinally. The rod G is provided at its end immediately over the gears $g'$ $g^2$ with a spring-bolt, $k$, which projects from said rod at right angles thereto, and bears against a pivoted lever, $k'$. (See Figs. 5, 6, and 11.) This lever $k'$ is secured on the end of a small vertical oscillating shaft, $k^2$, which is provided at its lower end with projecting arms $k^3$ $k^3$, which engage with the sliding clutch-collar $h^4$ on the counter-shaft $h$. As the sliding rod is moved longitudinally in either direction, the spring-bolt $k$ presses against the lever at either side of its center of oscillation and forces said lever outward at this point, thus oscillating the shaft $k^2$ and shifting the clutch $h^4$. A longitudinal movement of the sliding rod G in either direction thus moves the clutch-collar out of engagement with one of the pinions $h'$ $h^2$ and into engagement with the other. When the said clutch-collar is engaged with the pinion $h'$, this pinion revolves with the counter-shaft, and, through the medium of the intermediate gear, $h^3$, and spur-gear $g'$, revolves the screw F in the same direction with the counter-shaft $h$. When, however, the rod G is shifted, thus throwing the clutch-collar $h^4$ out of engagement with the pinion $h'$ and into engagement with the pinion $h^2$, the screw F is revolved in the opposite direction by reason of the direct engagement of the pinion $h^2$ with the spur-gear $g^2$. The outwardly-projecting arm $k^4$ on the shaft $k^2$ forms a hand lever, by which the clutch-collar $h^4$ may be shifted in either direction, as desired, by hand. By turning the said lever so that the clutch-collar is out of engagement with both of said pinions, the screw F may be revolved in either direction by the hand-wheel $F^2$.

The operation of the above-described machine is as follows: The guard-fingers, having the holes drilled therein to receive the rivets which secure the said fingers to the finger-bar, are placed in the respective pockets $b$ in the chucking device C, the slot in said fingers being placed over the guide or gage $c'$ at the front of said pocket. The sliding pin $e$ is then inserted in the lower rivet-hole of the said finger, and the finger is then clamped tightly against the gage $c'$ by turning the cam $d'$, thus forcing the piston $d$ against the back of the guard, after which the bearing-screw $e'$ is turned out until it rests against the finger, thus forming an additional support therefor at the lower end to prevent springing. The machine is now started, and the revolving cutter or milling-tool is drawn along by the feeding-screw in contact with the shanks of the guard-fingers, and each one of said fingers is milled off exactly alike. The cutting-edge of each guard-finger being forced against the gage $c'$, the distance from said cutting-edge to the face of the shank is accurately gaged in each case. As the milling-tool passes each successive finger, this finger is removed from the chucking device and replaced by another, so that by the time the last finger in the series has been milled off an entirely new set occupy the pockets in the chucking device. The projection $i$ on the traveling carriage comes against the collar $j$ on the sliding rod G, and thus reverses the motion of the feeding-screw, as before described, causing the milling-tool to travel back over the new series of fingers, which in turn are removed and replaced, as before, so that a continuous motion of the traveling head back and forth on the frame and a continuous operation of milling are secured. By this operation, as above described, it will be seen that the fingers may be easily, quickly, and accurately milled off to a uniform standard.

I preferably provide the revolving shaft D' with adjustable collars and bearings, as shown in Fig. 7, so that a longitudinal adjustment of the shaft may be secured to compensate for any wear in the milling-tool by grinding or otherwise.

Instead of having the revolving tool adapted to move past the chucking device, it is obvious that the chucking device may be adapted to move past the cutting-tool with the same result.

I claim—

1. The combination, with the traveling head and the revolving cutter, of the chucking device having a series of pockets and clamping mechanism therein, substantially as set forth.

2. The combination, with the traveling head and the revolving cutter, of the chucking device having the pockets therein, a gage-plate forming the front side of said pockets, and clamping mechanism opposite said gage-plate, adapted to press the guard-finger against said plate, substantially as and for the purpose set forth.

3. The combination, with the traveling head and revolving cutter, of the chucking device having a series of pockets therein, a gage-plate adapted to form the front of each of said pockets, a sliding piston extending into said pockets opposite said gage-plate, and means for moving said piston longitudinally, substantially as specified.

4. The combination, with the revolving cutter, of the pocket provided at the front with a gage-plate adapted to enter the slot in the guard-finger, and at the rear with a sliding piston and a cam adapted to move said piston longitudinally, substantially as set forth.

5. The combination, with the revolving cutter, of the pocket provided with the gage at the front thereof adapted to enter the slot in the guard-finger, a sliding pin below said pocket, adapted to engage the rivet-hole in said finger, a sliding piston extending into said pocket opposite said gage-plate, and means for moving said sliding piston longitudinally, substantially as and for the purpose set forth.

6. The combination, with a cutting-tool, of the pocket provided with the gage-plate, a sliding piston extending into said pocket opposite said gage-plate, a cam to operate said piston, a sliding pin, $e$, and a bearing-screw, $e'$, substantially as specified.

7. The combination, with the chucking device provided with a series of pockets therein and clamping mechanism in each of said pockets, of the traveling head having the revolving tool thereon, feeding mechanism for moving said traveling head, and means for reversing the motion of said feeding mechanism, substantially as set forth.

8. The combination, with the chucking device having a series of pockets therein, a gage-plate, and clamping mechanism in each of said pockets, of a traveling head having a revolving cutter thereon, a feeding-screw adapted to move said head, a sliding rod having variable collars thereon, adapted to be engaged by said traveling head, and clutching mechanism operated by said sliding rod, adapted to disconnect the feeding-screw from its revolving mechanism and connect the same to mechanism by which it is revolved in the opposite direction, substantially as and for the purpose set forth.

9. The combination, with the chucking device having a series of pockets, and clamping mechanism therein adapted to hold the guard-fingers, of a milling-tool adjacent to said chucking device, adapted to act on the guards therein, and means for securing a continuous passing of the tool and the clamping mechanism, either by moving the said cutter in relation to the chucking device or by moving the chucking device in relation to the milling-tool, substantially as and for the purpose set forth.

In testimony whereof I have hereunto set my hand this 29th day of December, A. D. 1885.

JOHN F. WEBSTER.

Witnesses:
  F. WILLIS BAINES,
  CHASE STEWART.